(12) United States Patent
Torita et al.

(10) Patent No.: US 10,547,087 B2
(45) Date of Patent: Jan. 28, 2020

(54) SECONDARY BATTERY

(71) Applicant: TOYOTA JIDOSHA KABUSHIKI KAISHA, Toyota-shi, Aichi-ken (JP)

(72) Inventors: Koji Torita, Nagoya (JP); Yukinobu Miyamura, Osaka (JP); Hiroaki Imanishi, Moriguchi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 177 days.

(21) Appl. No.: 15/725,401

(22) Filed: Oct. 5, 2017

(65) Prior Publication Data

US 2018/0108950 A1    Apr. 19, 2018

(30) Foreign Application Priority Data

Oct. 13, 2016 (JP) ................ 2016-201605

(51) Int. Cl.
| | |
|---|---|
| *H01M 10/42* | (2006.01) |
| *H01M 10/52* | (2006.01) |
| *H01M 2/34* | (2006.01) |
| *H01M 2/02* | (2006.01) |

(52) U.S. Cl.
CPC ..... *H01M 10/4257* (2013.01); *H01M 2/0202* (2013.01); *H01M 2/345* (2013.01); *H01M 10/52* (2013.01); *H01M 2010/4271* (2013.01); *H01M 2200/20* (2013.01)

(58) Field of Classification Search
CPC ... H01M 2/345; H01M 2200/20; H01M 10/52
See application file for complete search history.

(56) References Cited

U.S. PATENT DOCUMENTS

| | | | |
|---|---|---|---|
| 6,342,826 B1* | 1/2002 | Quinn | H01H 35/343 337/13 |
| 2011/0052949 A1 | 3/2011 | Byun et al. | |
| 2012/0237802 A1 | 9/2012 | Byun et al. | |
| 2015/0221927 A1* | 8/2015 | Lee | H01M 2/345 429/163 |

FOREIGN PATENT DOCUMENTS

| | | |
|---|---|---|
| JP | 08124554 A | 5/1996 |
| JP | 2011-054561 A | 3/2011 |
| JP | 2012-195278 A | 10/2012 |

* cited by examiner

*Primary Examiner* — Jonathan G Jelsma

(74) *Attorney, Agent, or Firm* — Sughrue Mion, PLLC

(57) ABSTRACT

A secondary battery includes a reverse plate formed using a conductive material and provided in a case, and a fixing member formed using an elastically deformable material and joined to the reverse plate. When an internal pressure in the case is increased, the reverse plate deforms in response to the internal pressure, to thereby electrically connect a positive electrode terminal and a negative electrode terminal. With the increase in the internal pressure, the fixing member elastically deforms from a state where it is inserted into the through hole, exits the through hole and is fixed between the reverse plate and the case. The reverse plate in the deformed state is supported by the fixed fixing member.

7 Claims, 16 Drawing Sheets

FIG.2 <COMPARATIVE EXAMPLE>
NORMAL STATE
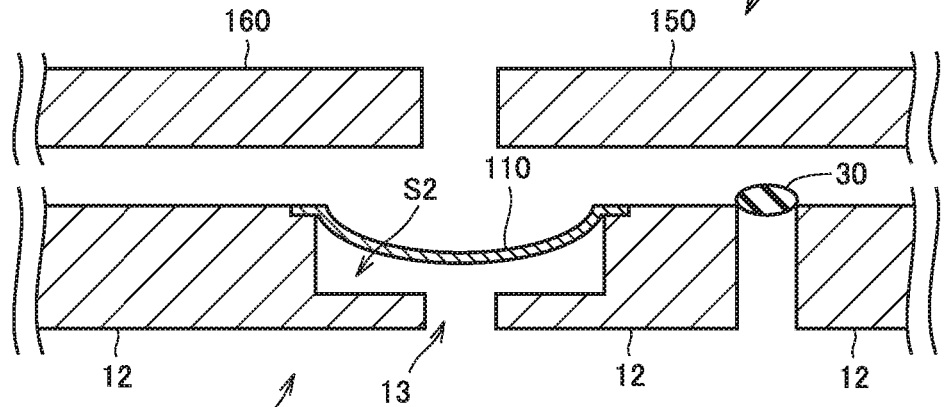
REVERSE PLATE IS REVERSED DUE TO INTERNAL PRESSURE INCREASE
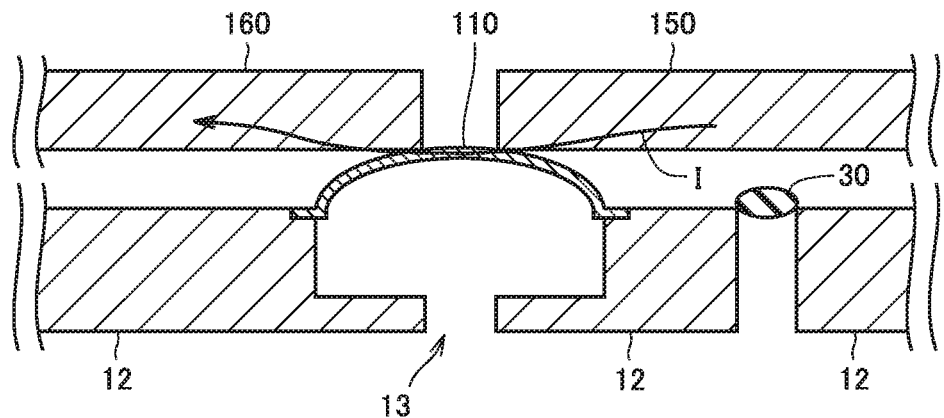
EXPLOSION-PROOF VALVE OPERATES
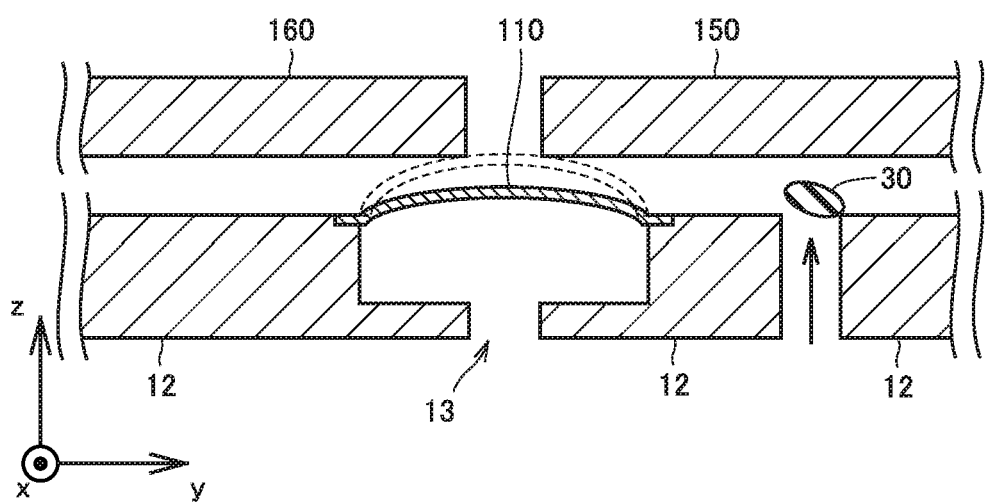

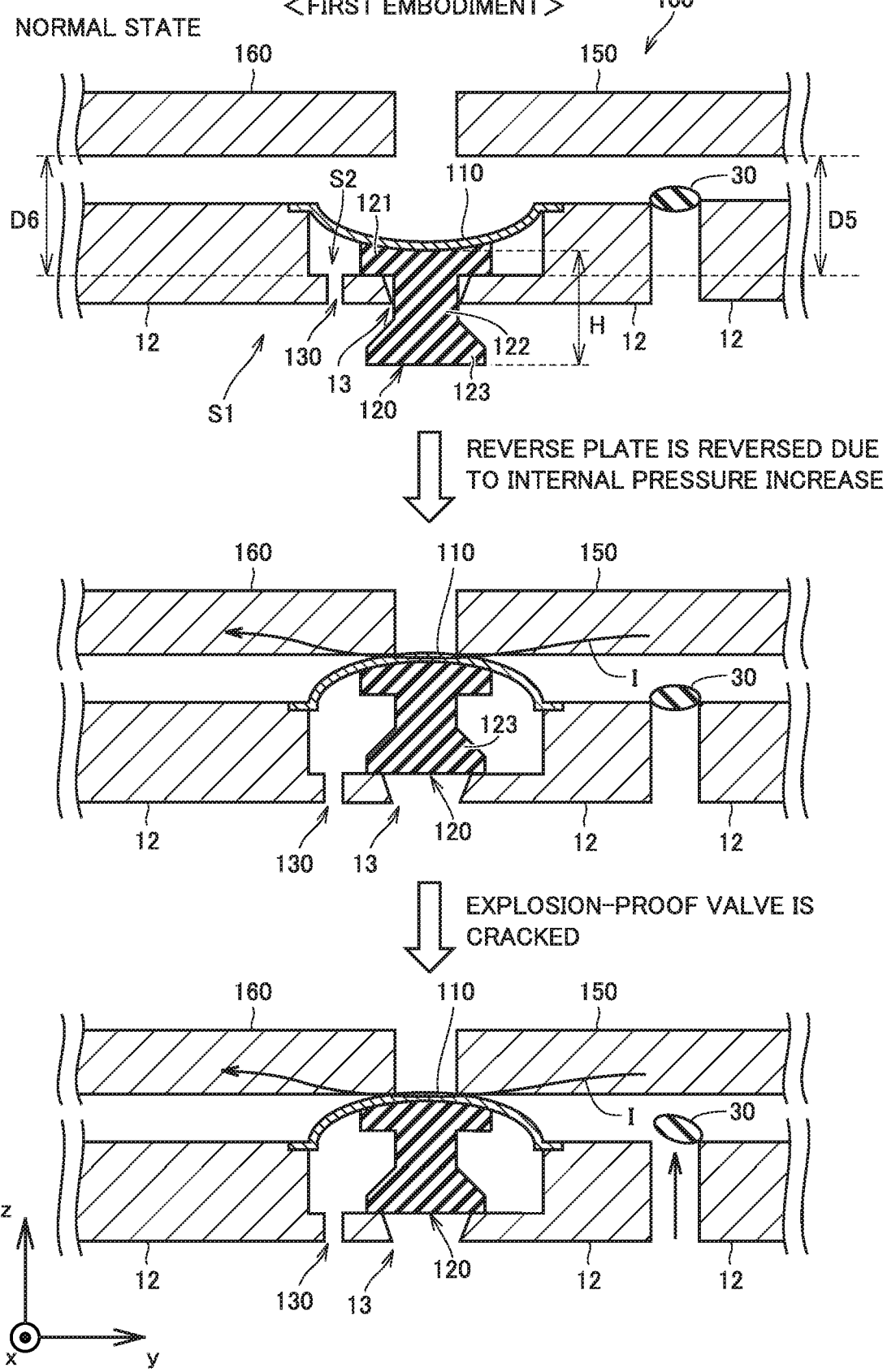

FIG.4
NORMAL STATE
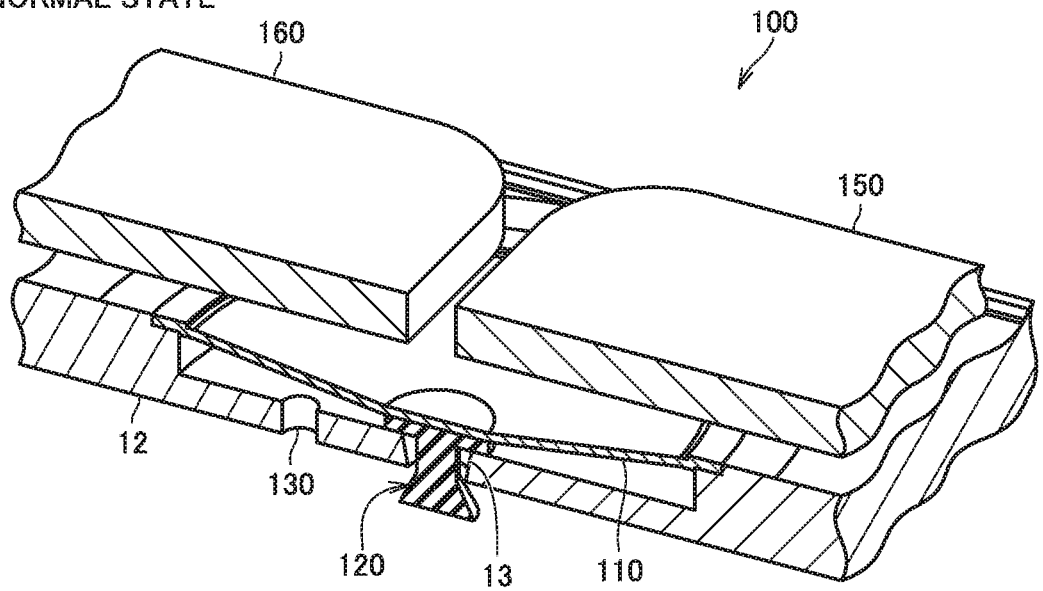
⬇ INTERNAL PRESSURE INCREASE
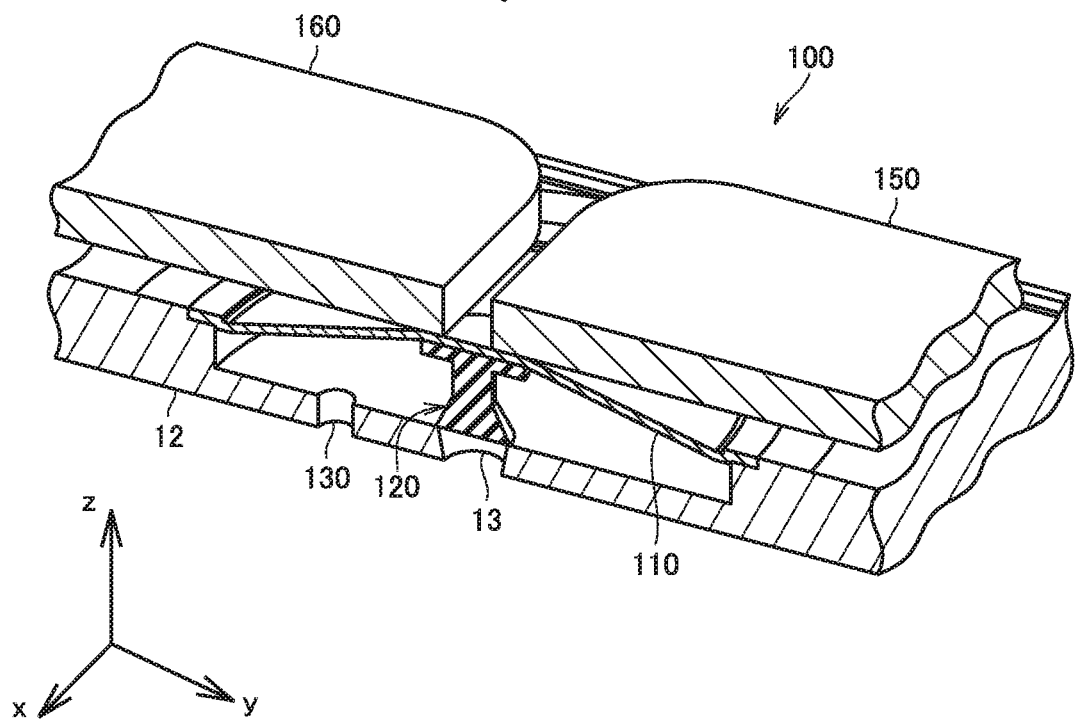

<FIRST VARIATION OF FIRST EMBODIMENT>

FIG.6
NORMAL STATE
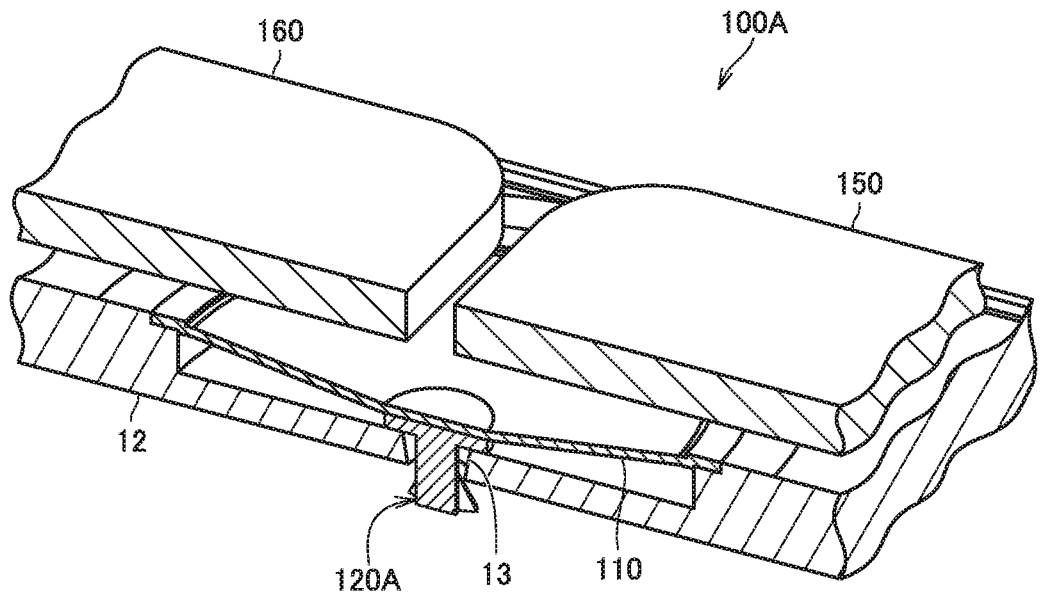
⬇ INTERNAL PRESSURE INCREASE
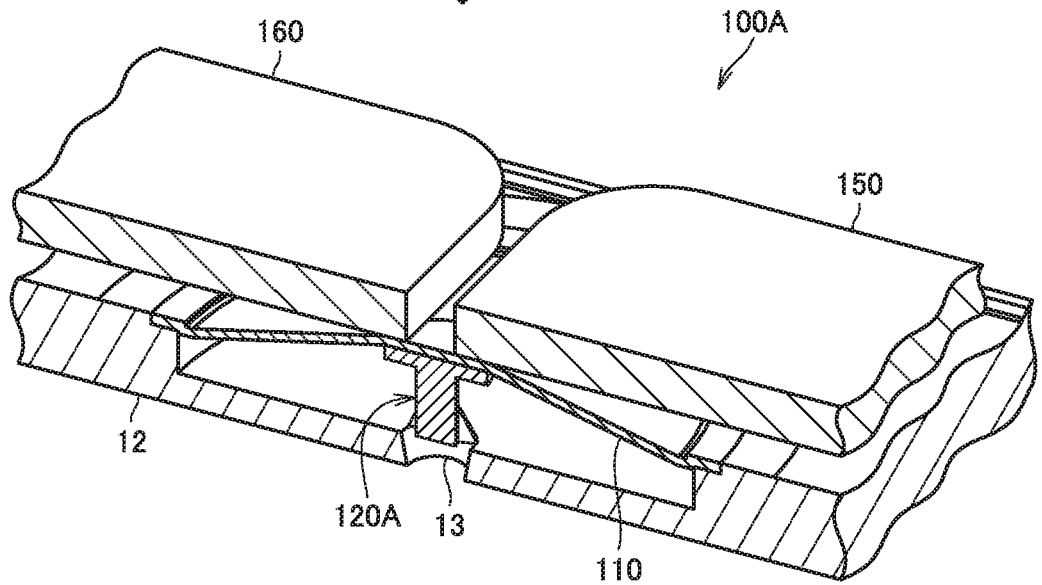

FIG.8
NORMAL STATE
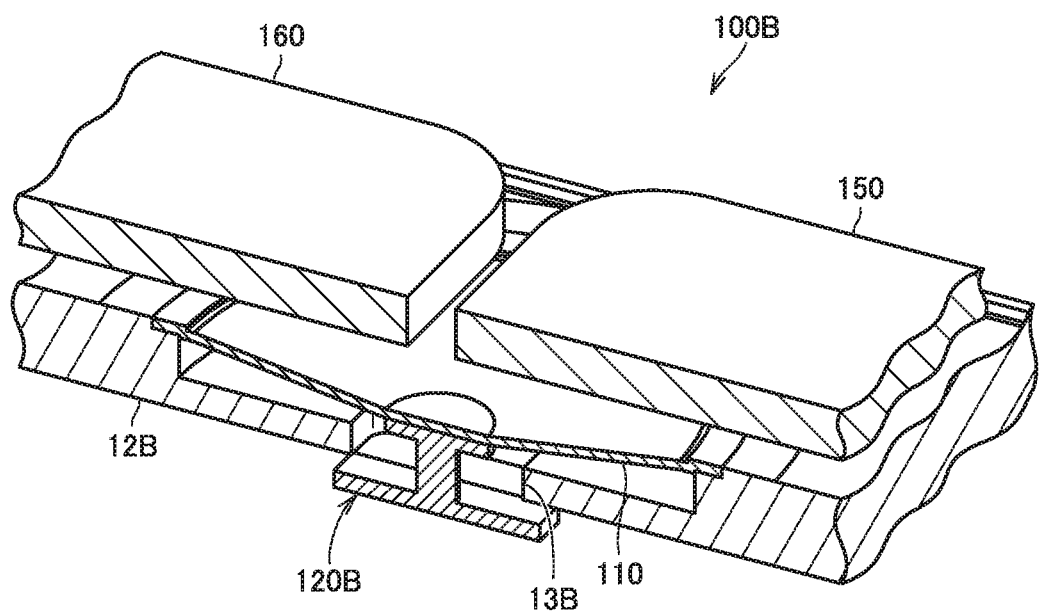
⬇ INTERNAL PRESSURE INCREASE
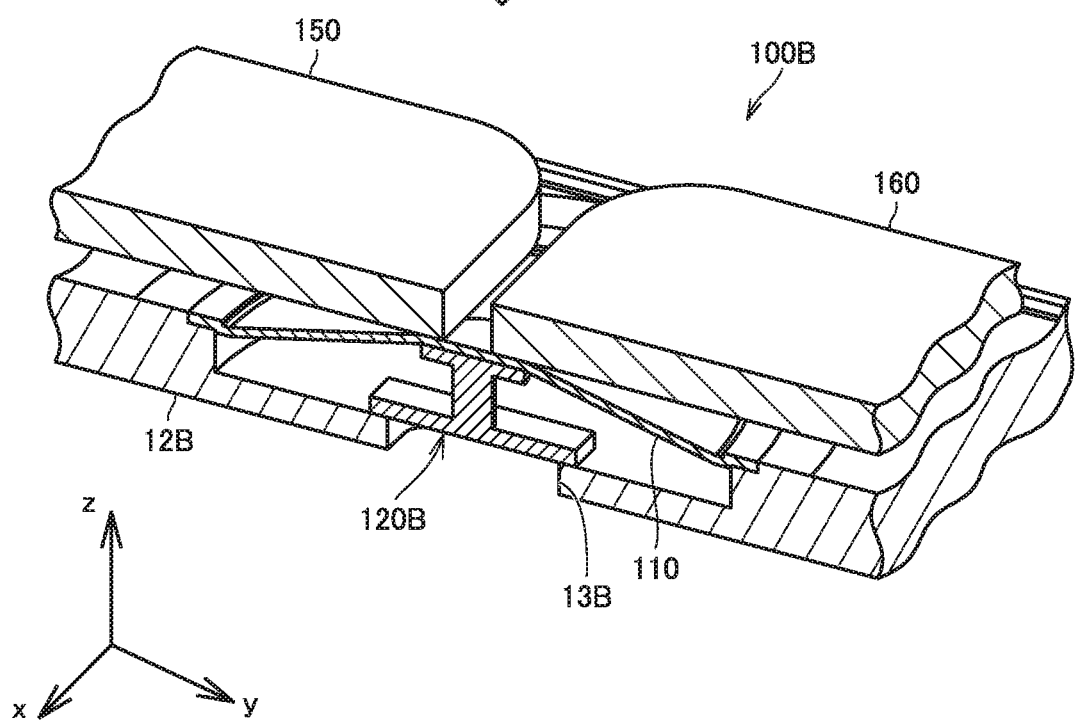

FIG.9
NORMAL STATE <SECOND EMBODIMENT>
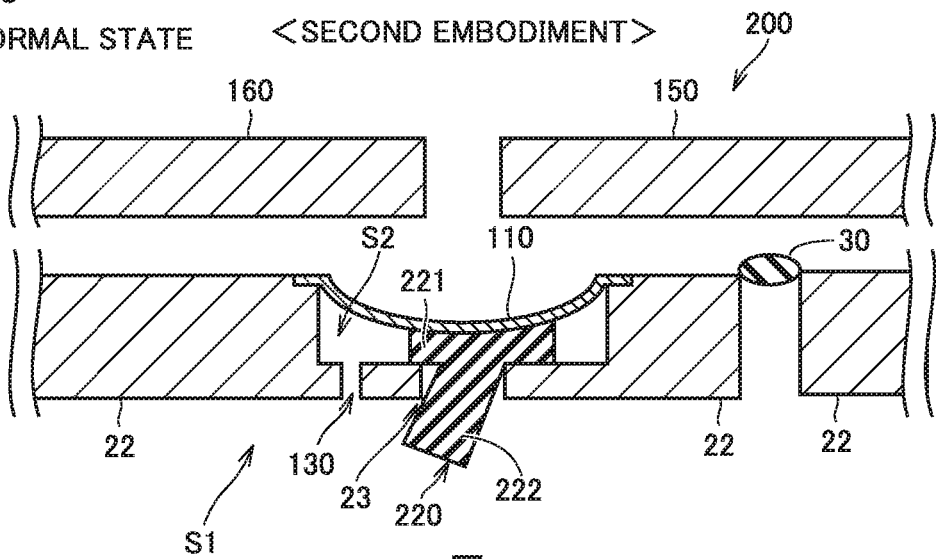
REVERSE PLATE IS REVERSED DUE TO INTERNAL PRESSURE INCREASE
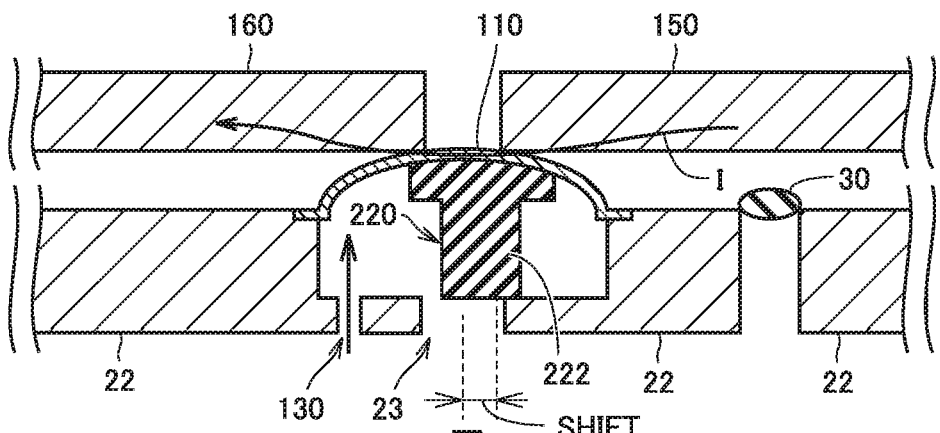
EXPLOSION-PROOF VALVE OPERATES
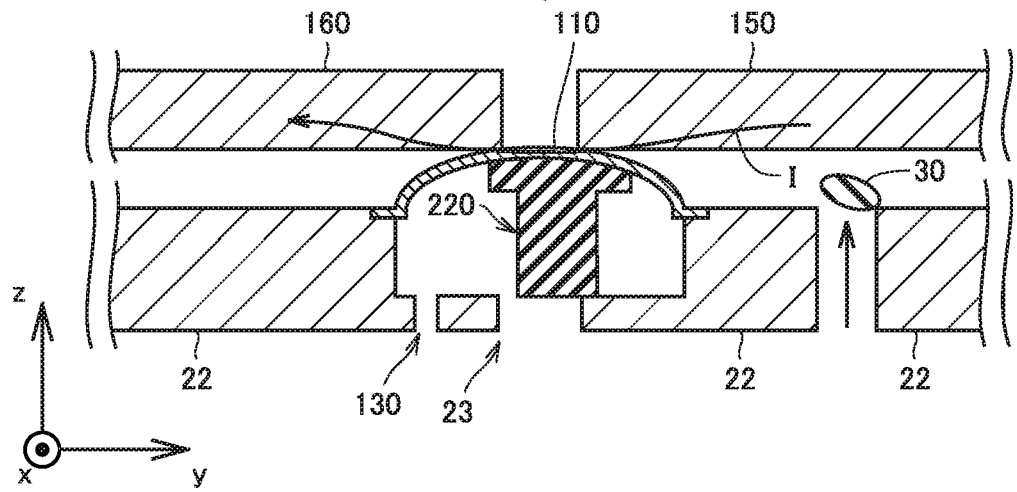

FIG.10
NORMAL STATE
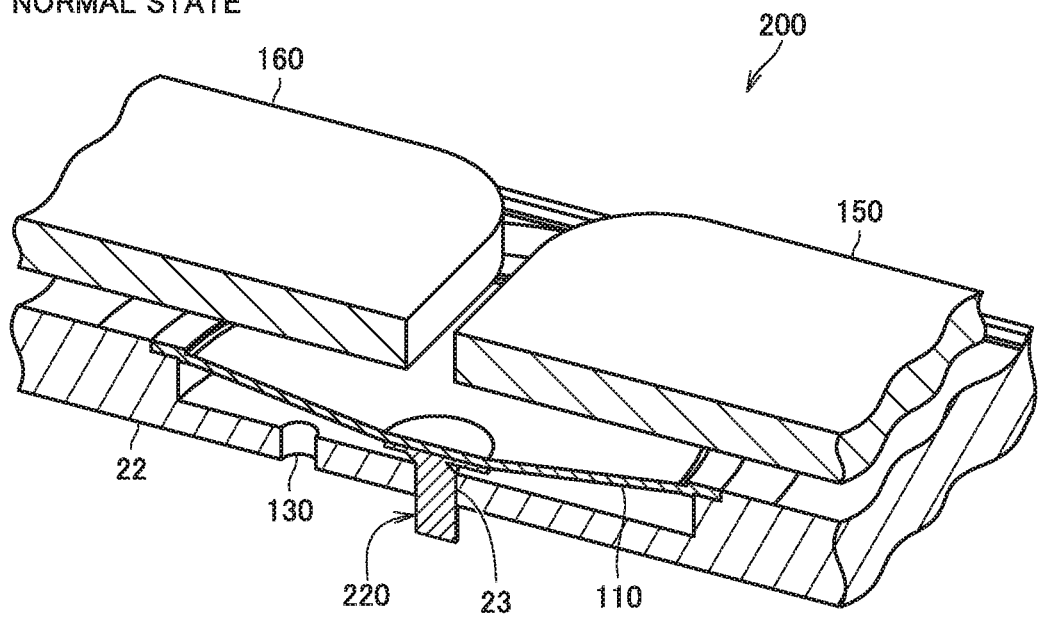
INTERNAL PRESSURE INCREASE
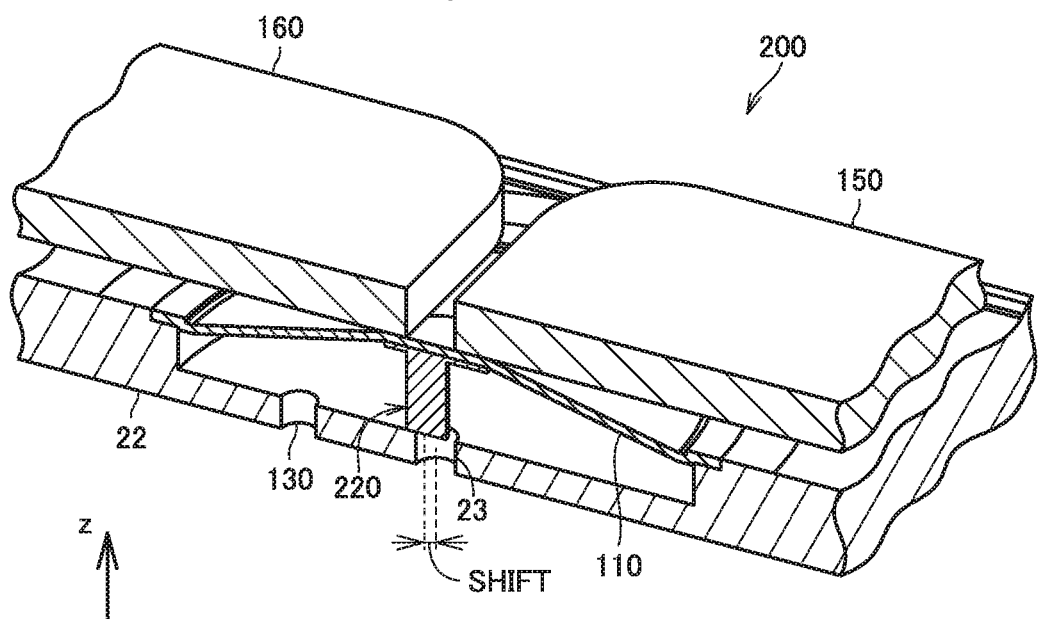

<VARIATION OF SECOND EMBODIMENT>

<VARIATION OF SECOND EMBODIMENT>

FIG.13
NORMAL STATE
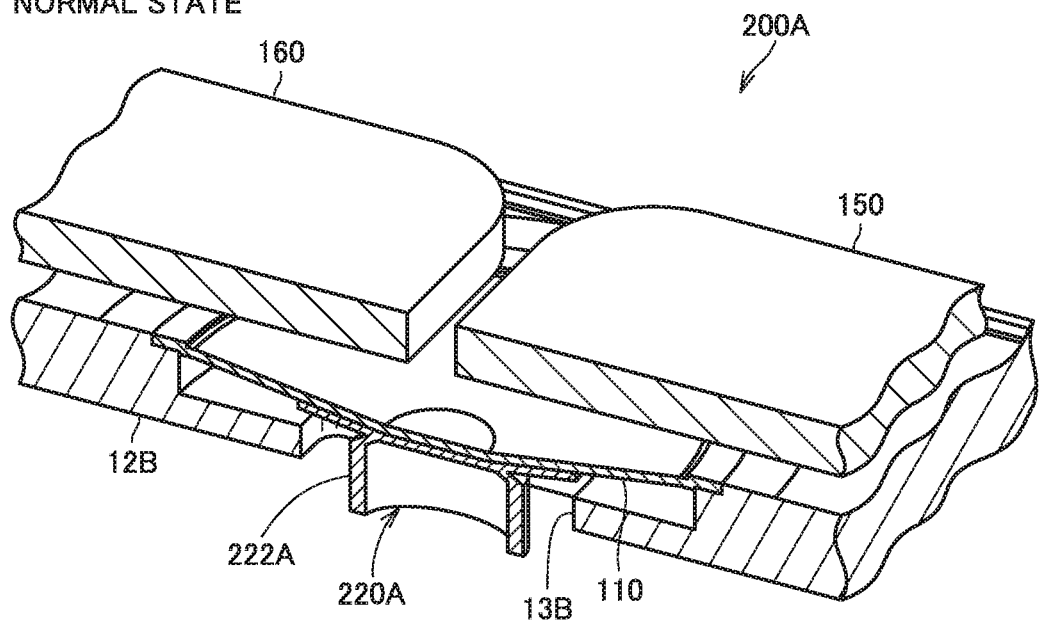
INTERNAL PRESSURE INCREASE
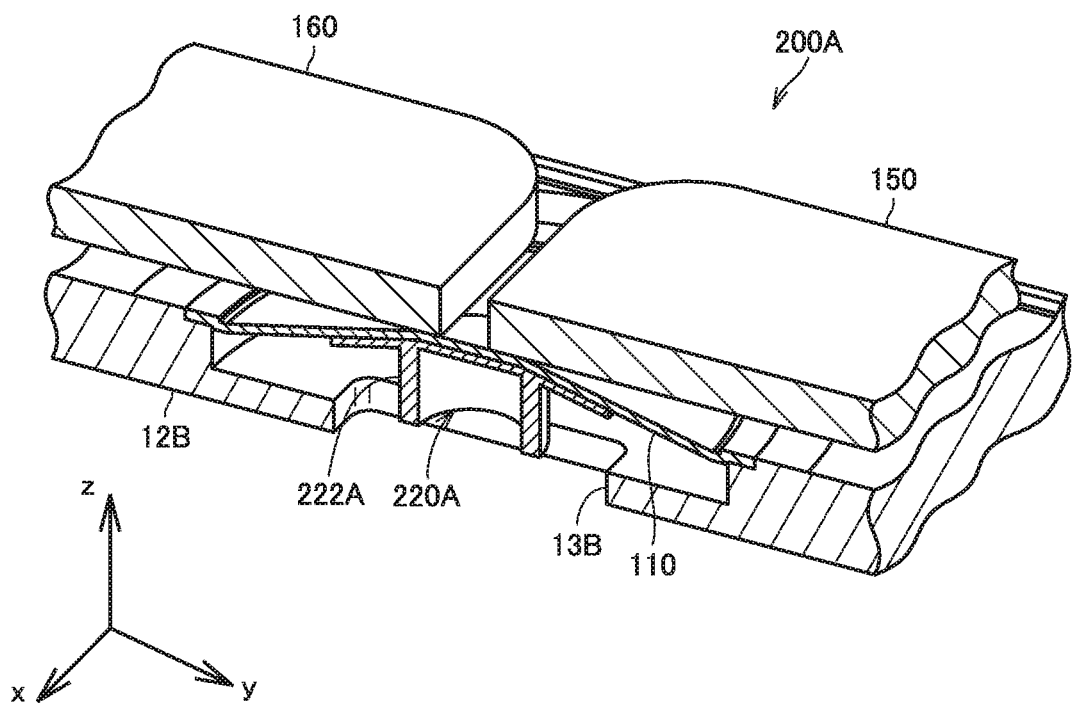

SECONDARY BATTERY

This nonprovisional application is based on Japanese Patent Application No. 2016-201605 filed on Oct. 13, 2016, with the Japan Patent Office, the entire contents of which are hereby incorporated by reference.

BACKGROUND

Field

The present disclosure relates to a secondary battery.

Description of the Background Art

In a secondary battery such as a lithium-ion secondary battery or a nickel-metal hydride battery, an internal pressure in a case may be increased due to gas generation associated with overcharging or the like. In preparation for such an occasion, there has been proposed a short-circuiting mechanism that short-circuits a positive electrode terminal and a negative electrode terminal by utilizing the internal pressure increase. According to Japanese Patent Laying-Open No. 2011-54561, for example, a short-circuiting mechanism can operate to short-circuit a positive electrode terminal and a negative electrode terminal to thereby reduce the state of charge (SOC) of a secondary battery, thus suppressing heat generation, breakage and the like associated with overcharging.

SUMMARY

The short-circuiting mechanism disclosed in Japanese Patent Laying-Open No. 2011-54561, for example, includes a positive electrode short-circuit portion electrically connected to a positive electrode terminal (first electrode terminal), a negative electrode short-circuit portion electrically connected to a negative electrode terminal (second electrode terminal), and a reverse plate formed using a conductive material. The reverse plate is provided in a case. When the internal pressure is increased and a predetermined pressure is applied to the reverse plate, the reverse plate deforms (is reversed) and makes contact with both the positive electrode short-circuit portion and the negative electrode short-circuit portion. A positive electrode short-circuit plate and a negative electrode short-circuit plate are thereby brought into conduction through the reverse plate, causing the positive electrode terminal and the negative electrode terminal to be short-circuited (electrically connected).

After the reverse plate has deformed as described above, the internal pressure may be reduced. When the case is provided with an explosion-proof valve, for example, if the explosion-proof valve operates after the deformation of the reverse plate, the inside and outside of the case are communicated with each other, which may cause a reduction in the internal pressure to atmospheric pressure. The internal pressure may also be reduced due to a reduction in ambient temperature of the secondary battery.

With such a reduction in the internal pressure, force of pressing the reverse plate against the positive electrode short-circuit portion and the negative electrode short-circuit portion is reduced. Accordingly, a gap may be formed between the reverse plate and the positive electrode short-circuit portion or between the reverse plate and the negative electrode short-circuit portion, or the reverse plate may return to the original shape (state before the deformation). This causes the positive electrode short-circuit portion and the negative electrode short-circuit to fall out of conduction, resulting in failure to maintain the short-circuited state between the positive electrode terminal and the negative electrode terminal.

The present disclosure was made to solve the above-described problem, and has an object to provide a secondary battery capable of more reliably maintaining a state where a first electrode terminal and a second electrode terminal are electrically connected after deformation of a reverse plate.

A secondary battery according to one aspect of the present disclosure includes a battery element, a case, a first electrode terminal and a second electrode terminal, a reverse plate, and a fixing member. The battery element includes a first electrode and a second electrode. The case is formed with a through hole and has a housing space that houses the battery element. The first electrode terminal is provided in the case and electrically connected to the first electrode. The second electrode terminal is provided in the case and electrically connected to the second electrode. The reverse plate is formed of a conductive material and provided in the case. The fixing member is formed to include an elastically deformable material, and coupled to the reverse plate while being inserted into the through hole. A communication space is formed between the case and the reverse plate, the communication space being communicated with the housing space through the through hole. An increase in internal pressure in the housing space also causes an increase in internal pressure in the communication space. The reverse plate deforms in response to the increased internal pressure in the communication space, to thereby electrically connect the first electrode terminal and the second electrode terminal. The fixing member inserted into the through hole elastically deforms and exits the through hole with the increase in the internal pressure in the housing space, to be fixed in the communication space. The reverse plate in the deformed state is supported by the fixing member fixed in the communication space.

Preferably, the fixing member includes a projection projecting toward an outer circumference with respect to the through hole when the through hole is seen in plan view. The projection is disposed in the housing space before the increase in the internal pressure in the housing space.

Preferably, the fixing member includes a solid cylindrical shaft portion with one end coupled to the reverse plate. When the internal pressure in the housing space is increased, the shaft portion exits the through hole and is restored from a state where it is bent and inserted into the through hole, and is fixed in the communication space.

Preferably, the fixing member includes a hollow cylindrical shaft portion with one end coupled to the reverse plate. When the internal pressure in the housing space is increased, the shaft portion exits the through hole and is restored from a state where it is radially compressed and inserted into the through hole, and is fixed in the communication space.

According to the above structure, when the internal pressure in the housing space is increased, the fixing member exits the through hole and is fixed in the communication space, thereby supporting the reverse plate in the deformed state. Thus, the state where the first electrode terminal and the second electrode terminal are electrically connected through the reverse plate can be more reliably maintained.

Preferably, the secondary battery further includes a short-circuit portion electrically connected to one of the first electrode terminal and the second electrode terminal. The case includes a case body formed with an opening, and a lid member that closes the opening and forms the communication space between the reverse plate and the lid member. The short-circuit portion is provided opposite to the case body with the lid member interposed therebetween, and spaced from the lid member. The reverse plate deforms from the lid member side toward the short-circuit portion in response to the increased internal pressure in the housing space, to thereby make contact with the short-circuit portion. In a direction from the lid member toward the short-circuit portion, a length of the fixing member before the increase in the internal pressure in the housing space is equal to or greater than a distance between the lid member and the short-circuit portion.

According to the above structure, when the fixing member is fixed in the communication space, the fixing member contracts in a direction from the lid member toward the short-circuit portion. Thus, elastic force applied to the reverse plate from the fixing member trying to be restored can be increased. Therefore, the reverse plate in the deformed state can be more reliably supported.

Preferably, the case is further formed with a communication hole communicated with the communication space.

According to the above structure, the housing space and the communication space are communicated with each other by the communication hole in addition to the through hole. Accordingly, when the internal pressure in the housing space is increased, even if the through hole is closed by the fixing member, the internal pressure increase in the housing space is transmitted to the communication space through the communication hole, causing the internal pressure to be applied to the reverse plate. This internal pressure reinforces the force applied to the reverse plate. Therefore, the reverse plate in the deformed state can be more reliably supported.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 2 is a diagram for illustrating the structure of a short-circuiting mechanism included in a secondary battery according to a comparative example.

FIG. 3 is a diagram for illustrating the structure of a short-circuiting mechanism included in the secondary battery according to the first embodiment.

FIG. 4 is an enlarged perspective view showing in more detail the structure of the short-circuiting mechanism in the first embodiment.

FIG. 6 is an enlarged perspective view showing in detail the structure of a short-circuiting mechanism in the first variation of the first embodiment.

FIG. 8 is an enlarged perspective view showing in more detail the structure of a short-circuiting mechanism in the second variation of the first embodiment.

FIG. 9 is a schematic diagram for illustrating the structure of a short-circuiting mechanism included in a secondary battery according to a second embodiment.

FIG. 10 is an enlarged perspective view showing in more detail the structure of the short-circuiting mechanism in the second embodiment.

FIG. 13 is an enlarged perspective view showing in detail the structure of a short-circuiting mechanism in the variation of the second embodiment.

DESCRIPTION OF THE PREFERRED EMBODIMENTS

Figure 1:
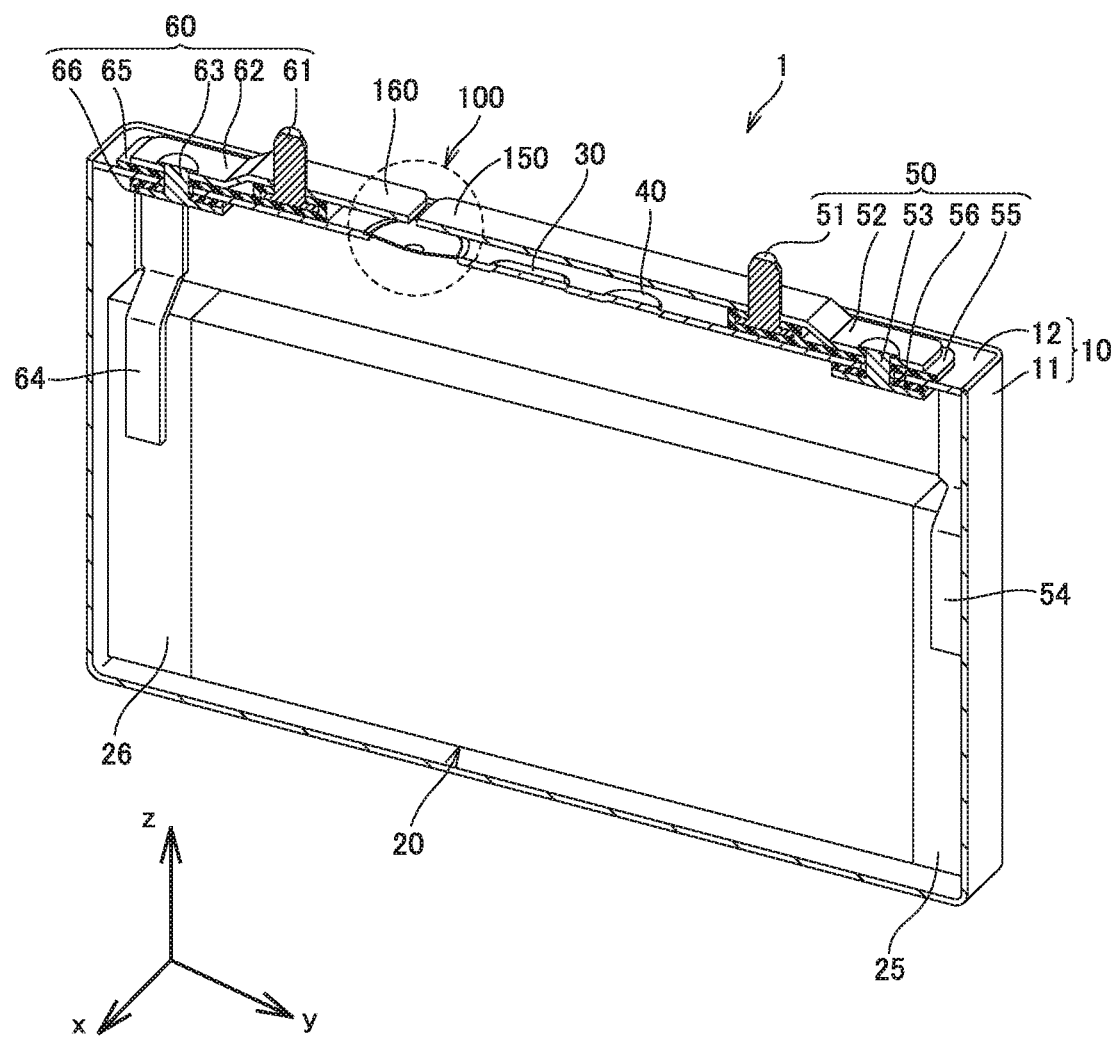
FIG. 1 is a perspective sectional view of a secondary battery according to a first embodiment.

Hereinafter, embodiments of the present disclosure will be described in detail with reference to the drawings. The same or corresponding parts are designated by the same characters in the drawings and description thereof will not be repeated.

First Embodiment

<Overall Structure of Secondary Battery>

FIG. 1 is a perspective sectional view of a secondary battery 1 according to a first embodiment. Secondary battery 1 is a lithium-ion secondary battery, for example. A plurality of secondary batteries 1 are connected in series to form a battery pack (not shown) having a desired voltage. This battery pack can be mounted on an electrically powered vehicle (not shown) such as a hybrid vehicle. However, the application of secondary battery 1 is not particularly limited. In the following description, a z direction in the drawings may be referred to as a "vertical direction," a positive z direction may be referred to as "upward," and a negative z direction may be referred to as "downward."

Secondary battery 1 includes a case 10 and an electrode body 20. Case 10 is formed in the shape of a flat rectangular parallelepiped, with a housing space S1 (see FIG. 3) that houses electrode body 20 and an electrolyte solution (not shown) formed in case 10. Case 10 includes a case body 11 having the shape of a substantially rectangular parallelepiped and formed with an opening that opens in one direction, and a lid member 12 that closes the opening provided in case body 11. Case body 11 and lid member 12 are formed of a metal material such as aluminum, and welded to each other.

Electrode body 20 includes a positive electrode sheet, a negative electrode sheet and a separator (none shown). The positive electrode sheet and the negative electrode sheet are wound (or stacked) with the separator interposed therebetween. Electrode body 20 has a positive electrode exposed portion (first electrode) 25 and a negative electrode exposed portion (second electrode) 26 provided on its one end and the other end, respectively. Electrode body 20 and the electrolyte solution correspond to a "battery element" according to the present disclosure.

Lid member 12 is provided with an explosion-proof valve 30 and an infusion plug 40. Explosion-proof valve 30 operates to prevent explosion of case 10 when an internal pressure P1 in case 10 (internal pressure in housing space S1) is increased and reaches a predetermined pressure. Infusion plug 40 is used to infuse the electrolyte solution into case 10.

Secondary battery 1 includes a positive electrode terminal (first electrode terminal) 50 and a negative electrode terminal (second electrode terminal) 60 provided in lid member 12. Positive electrode terminal 50 and negative electrode terminal 60 are spaced from each other in a long side direction (y direction) of case 10. Positive electrode terminal 50 includes a bolt 51, a positive electrode external terminal 52, a rivet member 53, an insulator 55 and a gasket 56. Bolt 51, positive electrode external terminal 52 and rivet member 53 are formed of a conductive material (for example, a metal material such as aluminum or copper).

Bolt 51 is provided to project upward from lid member 12. Bolt 51 is configured such that it can be fastened to a bolt (not shown) on the negative electrode side of another secondary battery adjacent to secondary battery 1. Rivet member 53 is spaced from bolt 51, and is inserted into a through hole formed in lid member 12. Positive electrode external terminal 52 is in the form of a thin plate extending between bolt 51 and rivet member 53, and electrically connects bolt 51 and rivet member 53. A collector electrode 54 is electrically connected to positive electrode exposed portion 25 of electrode body 20.

Insulator 55 and gasket 56 are formed of an insulating material. Examples of such an insulating material include a resin material such as PFA (perfluoroalkoxy fluororesin) or a rubber material such as EPDM (ethylene-propylene-diene rubber). Insulator 55 is disposed between positive electrode external terminal 52 and lid member 12, and electrically insulates positive electrode external terminal 52 from lid member 12. Gasket 56 is disposed between lid member 12 and the upper end of collector electrode 54, and electrically insulates lid member 12 from collector electrode 54 while sealing case 10.

Secondary battery 1 includes collector electrode 54 that electrically connects positive electrode terminal 50 and positive electrode exposed portion 25 of electrode body 20. Collector electrode 54 is also formed of a conductive material, similarly to rivet member 53 and positive electrode external terminal 52.

Secondary battery 1 further includes, similarly on the negative electrode side, a bolt 61, a negative electrode external terminal 62, a rivet member 63, a collector electrode 64, an insulator 65 and a gasket 66. Since the structure on the negative electrode side of secondary battery 1 is basically equivalent to the structure on the positive electrode side of secondary battery 1, detailed description will not be repeated.

Secondary battery 1 further includes a short-circuiting mechanism 100 between positive electrode external terminal 52 and negative electrode external terminal 62. Short-circuiting mechanism 100 is configured to short-circuit (electrically connect) positive electrode external terminal 52 and negative electrode external terminal 62 when an internal pressure P2 in a communication space S2 (described later) is increased due to gas generation associated with overcharging or the like of secondary battery 1.

Short-circuiting mechanism 100 includes a positive electrode short-circuit plate 150 and a negative electrode short-circuit plate 160 each formed using a conductive material. Positive electrode short-circuit plate 150 and negative electrode short-circuit plate 160 are spaced from lid member 12 so as to face lid member 12. More specifically, positive electrode short-circuit plate 150 and negative electrode short-circuit plate 160 are provided opposite to case body 11 (electrode body 20) with lid member 12 interposed therebetween. Positive electrode short-circuit plate 150 is electrically connected to positive electrode external terminal 52.

Negative electrode short-circuit plate 160 is electrically connected to negative electrode external terminal 62. Positive electrode short-circuit plate 150 may be formed integrally with or separately from positive electrode external terminal 52. Negative electrode short-circuit plate 160 may be formed integrally with or separately from negative electrode external terminal 62. At least one of positive electrode short-circuit plate 150 and negative electrode short-circuit plate 160 corresponds to a "short-circuit portion" according to the present disclosure.

In the first embodiment, secondary battery 1 is characterized by the structure of short-circuiting mechanism 100. To facilitate understanding of this characteristic, the structure of a short-circuiting mechanism 900 included in a secondary battery according to a comparative example will be described first. The structure other than short-circuiting mechanism 900 of the secondary battery according to the comparative example is common to the corresponding structure of secondary battery 1 according to the first embodiment.

<Short-Circuiting Mechanism of Secondary Battery According to Comparative Example>

FIG. 2 is a schematic diagram for illustrating the structure of short-circuiting mechanism 900 included in the secondary battery according to the comparative example. FIG. 2 and FIG. 3 which will be described later show the structure of a portion enclosed by a broken line circle in FIG. 1. As shown in FIG. 2, short-circuiting mechanism 900 includes a reverse plate 110 provided to cover a through hole 13 formed in lid member 12.

Reverse plate 110 is in the form of a thin plate, which is circular when seen in plan view in the vertical direction, and is formed using a conductive material such as aluminum. Reverse plate 110 is welded to lid member 12 along its circumference. Reverse plate 110 has a shape projecting toward through hole 13 in a normal state. In this state, positive electrode short-circuit plate 150 and negative electrode short-circuit plate 160 are not electrically connected.

When secondary battery 1 is in an overcharged state, for example, gas is generated due to decomposition or the like of the electrolyte solution housed in case 10, which may cause an increase in internal pressure P1 in housing space S1. The increase in the internal pressure in the housing space also causes an increase in internal pressure P2 in communication space S2 formed between lid member 12 and reverse plate 110. When a predetermined pressure is applied from the through hole 13 side to reverse plate 110, reverse plate 110 deforms from lid member 12 toward positive electrode short-circuit plate 150 and negative electrode short-circuit plate 160 (deforms into a shape recessed toward through hole 13), and makes contact with both positive electrode short-circuit plate 150 and negative electrode short-circuit plate 160. Positive electrode short-circuit plate 150 and negative electrode short-circuit plate 160 are thereby brought into conduction through reverse plate 110, causing positive electrode terminal 50 and negative electrode terminal 60 to be short-circuited (indicate a current I). As a result, the SOC of secondary battery 1 is reduced, thereby allowing protection of secondary battery 1 against heat generation, breakage or the like due to overcharging. In the following description, reverse plate 110 deforming to expand outward is also simply referred to as "reversed."

Here, if internal pressure P1 is further increased, explosion-proof valve 30 operates (for example, becomes cracked). The inside and outside of case 10 are thereby communicated with each other, causing a reduction in internal pressure P1 in housing space S1 to atmospheric pressure, which in turn causes a reduction in internal pressure P2 in communication space S2 to atmospheric pressure. As a result, a gap may be formed between reverse plate 110 and positive electrode short-circuit plate 150, or between reverse plate 110 and negative electrode short-circuit plate 160, or reverse plate 110 may return to the original shape (shape before the reversal). This causes positive electrode short-circuit plate 150 and negative electrode short-circuit plate 160 to fall out of conduction, resulting in failure to maintain the short-circuited state between positive electrode terminal 50 and negative electrode terminal 60.

Thus, in the first embodiment, a fixing member 120 coupled below reverse plate 110 is adopted as a structure for supporting the state where reverse plate 110 after the reversal is in contact with positive electrode short-circuit plate 150 and negative electrode short-circuit plate 160 even when internal pressure P2 in communication space S2 is reduced after the reversal of reverse plate 110. As will be described below in detail, when internal pressure P2 is increased, fixing member 120 slips out of through hole 13 with the reversal of reverse plate 110, and is fixed between reverse plate 110 and lid member 12 (communication space S2). The state where reverse plate 110 is in contact with positive electrode short-circuit plate 150 and negative electrode short-circuit plate 160 can thereby be retained.

<Short-Circuiting Mechanism of Secondary Battery According to First Embodiment>

FIG. 3 is a schematic diagram for illustrating the structure of short-circuiting mechanism 100 included in secondary battery 1 according to the first embodiment. FIG. 4 is an enlarged perspective view showing in more detail the structure of short-circuiting mechanism 100.

Referring to FIGS. 3 and 4, short-circuiting mechanism 100 is different from short-circuiting mechanism 900 in the comparative example (see FIG. 2) in that it further includes fixing member 120 formed using an elastically deformable material (for example, rubber), and that a communication hole 130 is formed in lid member 12.

Reverse plate 110 is provided to cover communication hole 130 in addition to through hole 13. That is, communication hole 130 causes communication between communication space S2 and housing space S1.

Fixing member 120 includes, as its components, an outer flange portion 121, a shaft portion 122 and an inner flange portion 123.

Shaft portion 122 is coupled (joined, for example, bonded) to the lower surface of reverse plate 110, and extends in the form of a solid cylinder between outer flange portion 121 and inner flange portion 123. Shaft portion 122 is provided as being inserted into through hole 13 (as extending through through hole 13) in the normal state.

Outer flange portion 121 is located above the upper surface of lid member 12, that is, outside case 10. When through hole 13 is seen in plan view in the vertical direction, outer flange portion 121 has the shape of a circle concentric with shaft portion 122, and projects toward the outer circumference from through hole 13. The upper surface of outer flange portion 121 is coupled to the lower surface of reverse plate 110. The lower surface of outer flange portion 121 and the upper surface of lid member 12 abut each other in the normal state.

Inner flange portion 123 is located below the lower surface of lid member 12, that is, inside case 10, in the normal state. When through hole 13 is seen in plan view in the vertical direction, inner flange portion 123 has the shape of a circle concentric with shaft portion 122, and projects toward the outer circumference from through hole 13. Inner flange portion 123 corresponds to a "projection" according to the present disclosure.

Reverse plate 110 has a diameter of 18 mm, for example, and a thickness of 0.3 mm, for example. Through hole 13 has a tapered shape of decreasing diameter from a circular opening provided in the upper surface of lid member 12 toward the inside of case 10 (downward). Through hole 13 has a diameter of up to (namely, at the upper surface of lid member 12) 2.0 mm, for example. Communication hole 130 has a diameter of 1.0 mm, for example. The lower surface (bottom surface) of inner flange portion 123 is a planar surface, and inner flange portion 123 has a tapered shape of decreasing diameter toward reverse plate 110 (upward). Inner flange portion 123 has a diameter of up to (namely, at the lower surface of inner flange portion 123) 2.2 mm, for example. It should be noted that the specific numerical values described herein are merely exemplary in order to facilitate understanding.

When internal pressure P1 in housing space S1 is increased, fixing member 120 rises in response to internal pressure P1, thus pushing up and reversing reverse plate 110. When reverse plate 110 is reversed, fixing member 120 is pulled upward. In so doing, inner flange portion 123, which is formed using an elastically deformable material, can elastically deform and pass through (exit) through hole 13. After passing through through hole 13, inner flange portion 123 is restored and placed on the upper surface of lid member 12. Fixing member 120 is thereby fixed in communication space S2 between reverse plate 110 and lid member 12. Then, the force of pressing reverse plate 110 against positive electrode short-circuit plate 150 and negative electrode short-circuit plate 160 continues to be applied from fixing member 120 to reverse plate 110.

Therefore, even when explosion-proof valve 30 operates to reduce internal pressure P1 and internal pressure P2 due to a further increase in internal pressure P1, the reversed shape of reverse plate 110 can be supported and reverse plate 110 can be prevented from returning to the original shape. Thus, the state where positive electrode short-circuit plate 150 and negative electrode short-circuit plate 160 are in contact with reverse plate 110 can be retained, and the short-circuited state between positive electrode terminal 50 and negative electrode terminal 60 can thereby be more reliably maintained. As a result, secondary battery 1 is discharged and reduced in SOC, and therefore, the overcharged state of secondary battery 1 can be eliminated.

Shaft portion 122 has a length H (the length of fixing member 120 along a depth direction of through hole 13, or the length of fixing member 120 in a direction from lid member 12 toward positive electrode short-circuit plate 150 and negative electrode short-circuit plate 160) of 25 mm, for example. On the other hand, a distance (spacing) D5 between positive electrode short-circuit plate 150 and lid member 12 and a distance (spacing) D6 between negative electrode short-circuit plate 160 and lid member 12 are almost equal (D5≈D6), which are 25 mm, for example. In this manner, length H of shaft portion 122 is preferably equal to or greater than the longer one of distance D5 between positive electrode short-circuit plate 150 and lid member 12, and distance D6 between negative electrode short-circuit plate 160 and lid member 12. The sum (=25.3 mm) of the thickness of reverse plate 110 (=0.3 mm) and length H of shaft portion 122 (=25 mm) is thus greater than distances D5 and D6 (=25 mm).

With such a structure, when fixing member 120 is fixed in communication space S2, fixing member 120 contracts in the vertical direction. Thus, elastic force (restoring force) applied to reverse plate 110 from fixing member 120 trying to be restored can be increased. Accordingly, reverse plate 110 can more reliably retain the reversed shape.

Furthermore, since the diameter of inner flange portion 123 of fixing member 120 (2.2 mm at the lower surface) is greater than the diameter of through hole 13 (2.0 mm at the upper surface), through hole 13 may be closed by inner flange portion 123 when fixing member 120 is fixed in communication space S2. In the first embodiment, however, since communication hole 130 is formed in lid member 12, internal pressure P2 can be applied directly (without delay) to reverse plate 110 through communication hole 130. Accordingly, the reversal of reverse plate 110 can be more reliably effected.

Even if communication hole 130 is not provided, when internal pressure P1 in housing space S1 is greater than internal pressure P2 in communication space S2 (P1>P2) with fixing member 120 being fixed in communication space S2, fixing member 120 continuously or intermittently floats from lid member 12, to form a gap between inner flange portion 123 and lid member 12. An increase in internal pressure P1 in housing space S1 can thereby be transmitted to communication space S2. Thus, communication hole 130 is not a required component.

As described above, in the first embodiment, when internal pressure P1 in housing space S1 is increased, internal pressure P1 pushes fixing member 120 upward to apply a force to reverse plate 110, thereby reversing reverse plate 110. Furthermore, internal pressure P2 in communication space S2 is applied to reverse plate 110 through communication hole 130, thereby reinforcing the force for reversing reverse plate 110. When reverse plate 110 is reversed, fixing member 120 is pulled upward and fixed between reverse plate 110 and lid member 12. Fixing member 120 is then stretched taut in the vertical direction, causing the force of pressing reverse plate 110 against positive electrode short-circuit plate 150 and negative electrode short-circuit plate 160 to be applied from fixing member 120 to reverse plate 110. Accordingly, even when internal pressures P1 and P2 are reduced after the reversal of reverse plate 110, the state where reverse plate 110 is in contact with positive electrode short-circuit plate 150 and negative electrode short-circuit plate 160 can be retained. Thus, positive electrode short-circuit plate 150 and negative electrode short-circuit plate 160 can be brought into conduction through reverse plate 110, and the short-circuited state between positive electrode terminal 50 and negative electrode terminal 60 can be more reliably maintained.

Although not shown, when a plurality of secondary batteries 1 are connected in series and mounted as a battery pack on an electrically powered vehicle, if any one of secondary batteries 1 is short-circuited, electric power can be taken out of other normal secondary batteries 1. Thus, the electrically powered vehicle can run using the electric power supplied from the other secondary batteries 1. In addition, since fixing member 120 is retained as being inserted into through hole 13 in the normal state (before reverse plate 110 is reversed), fixing member 120 is prevented from colliding with the other components due to vibration during the running of the electrically powered vehicle. Accordingly, breakage of fixing member 120 is less likely to occur, thereby improving the reliability of short-circuiting mechanism 100.

<Verification Tests>

To verify the effect of short-circuiting mechanism 100 configured as described above, the present inventors performed the following verification tests. Five samples of the secondary battery according to the comparative example and five samples of secondary battery 1 according to the first embodiment were prepared. Each of the samples had a hole (for example, a hole of $\varnothing$=5.0 mm; not shown) for adjusting internal pressure P1 in housing space S1 (and in turn P2) provided on a side surface of case 10. First, compressed air was delivered through this hole into case 10, to adjust internal pressure P1 to 1.0 MPa (megapascal). That state was then maintained for 10 seconds, and it was determined whether or not positive electrode terminal 50 and negative electrode terminal 60 were short-circuited. Then, the air inside case 10 was released into the atmosphere to reduce internal pressure P1 to atmospheric pressure (about 0.10 MPa), and it was again determined whether or not positive electrode terminal 50 and negative electrode terminal 60 were short-circuited.

In the comparative example, when internal pressure P1 reached 1.0 MPa, reverse plate 110 was normally reversed to short-circuit positive electrode terminal 50 and negative electrode terminal 60 in all the secondary batteries. Internal pressures P1 upon reversal of reverse plates 110 were measured, and their average value was 0.65 MPa. However, when internal pressure P1 was subsequently reduced to atmospheric pressure, reverse plate 110 could not retain the reversed shape in any of the secondary batteries. In other words, there was no secondary battery that could maintain the short-circuited state between positive electrode terminal 50 and negative electrode terminal 60.

In contrast, in the first embodiment, when internal pressure P1 reached 1.0 MPa, reverse plate 110 was normally reversed in all of secondary batteries 1. An average value of internal pressures P1 upon reversal of reverse plates 110 was 0.70 MPa, which was slightly higher than that of the comparative example. When internal pressure P1 was subsequently reduced to atmospheric pressure, reverse plate 110 retained the reversed shape and the short-circuited state between positive electrode terminal 50 and negative electrode terminal 60 was maintained in all of secondary batteries 1.

Although the first embodiment has described an example where internal pressure P1 is reduced due to the operation of explosion-proof valve 30, internal pressure P1 may be reduced due to a reduction in ambient temperature of secondary battery 1 (environmental temperature), for example. Thus, explosion-proof valve 30 is not a required component in secondary battery 1 according to the first embodiment.

[First Variation of First Embodiment]

The structure of the fixing member is not limited to that shown in FIG. 3 or 4. A first variation of the first embodiment and a second variation which will be described later will describe other structure examples of the fixing member.

Figure 5:
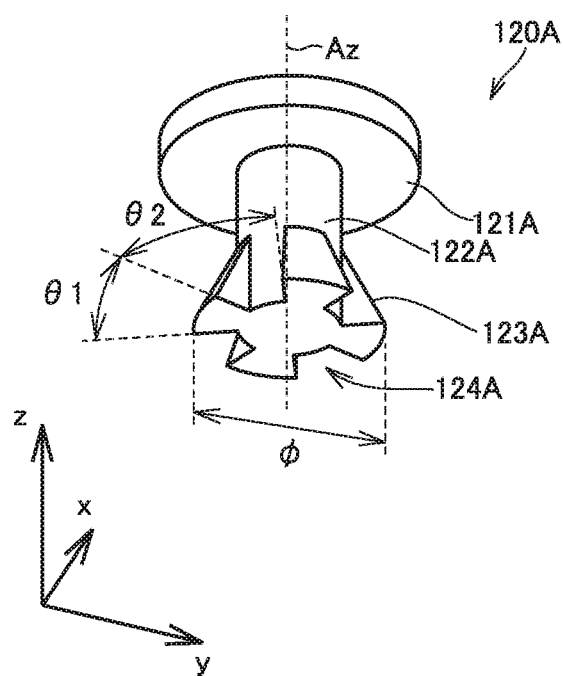
FIG. 5 is a perspective view showing a fixing member in a first variation of the first embodiment.

FIG. 5 is a perspective view showing a fixing member 120A in the first variation of the first embodiment. An outer flange portion 121A and a shaft portion 122A of fixing member 120A are equivalent to outer flange portion 121 and shaft portion 122 of fixing member 120 in the first embodiment, respectively.

An inner flange portion 123A of a short-circuiting mechanism 100A is different from inner flange portion 123 of short-circuiting mechanism 100 in that it is provided with notches 124A at four locations, for example. These notches 124A are each fan-shaped when fixing member 120A is seen in plan view in the vertical direction, and are provided in a rotationally symmetric manner around a central axis Az of shaft portion 122A.

When seen in plan view in the vertical direction, an angle θ1 formed by a radius portion of the fan shape of inner flange portion 123A (portion not provided with notch 124A) and an angle θ2 formed by a radius portion of the fan shape of notch 124A are each 45°, for example. The number of notches 124A provided and angles θ1, θ2 can be changed as appropriate. Inner flange portion 123A has a diameter ϕ of 2.2 mm, for example, as in the first embodiment.

FIG. 6 is an enlarged perspective view showing in detail the structure of short-circuiting mechanism 100A in the first variation of the first embodiment. Short-circuiting mechanism 100A is different from short-circuiting mechanism 100 in the first embodiment (see FIG. 4) in that communication hole 130 is not provided in lid member 12.

In short-circuiting mechanism 100A, since inner flange portion 123A is provided with notches 124A, the complete closure of through hole 13 by inner flange portion 123B is prevented even when inner flange portion 123A is elastically deforming and exiting through hole 13 (and after exiting through hole 13) with an increase in internal pressure Pb. Therefore, even in the structure not provided with communication hole 130, internal pressure P1 is reliably applied to reverse plate 110 through notches 124A. However, short-circuiting mechanism 100A may also be provided with communication hole 130.

Since the structure of short-circuiting mechanism 100A is otherwise equivalent to the corresponding structure of short-circuiting mechanism 100 in the first embodiment, detailed description will not be repeated. In addition, since numerical values equivalent to those described in the first embodiment can be employed as the sizes of the respective components, detailed description will not be repeated.

In short-circuiting mechanism 100A, too, similarly to short-circuiting mechanism 100, even when explosion-proof valve 30 operates due to an increase in internal pressure P1, fixing member 120A is stretched taut between lid member 12 and reverse plate 110, so that the force of pressing reverse plate 110 against positive electrode short-circuit plate 150 and negative electrode short-circuit plate 160 continues to be applied from fixing member 120A to reverse plate 110. Thus, reverse plate 110 can retain the reversed shape. Accordingly, reverse plate 110 can be prevented from returning to the original shape, and the state where positive electrode short-circuit plate 150 and negative electrode short-circuit plate 160 are in contact with reverse plate 110 can be more reliably maintained. Thus, the short-circuited state between positive electrode terminal 50 and negative electrode terminal 60 can be more reliably maintained.

In the first variation of the first embodiment, too, verification tests similar to those in the first embodiment were performed. The results were that when internal pressure P1 reached 1.0 MPa, reverse plate 110 was normally reversed in all the secondary batteries. An average value of internal pressures P1 upon reversal of reverse plates 110 was 0.67 MPa, which was slightly lower than the value in the first embodiment (0.70 MPa). It was also confirmed that the short-circuited state between positive electrode terminal 50 and negative electrode terminal 60 was normally maintained even when internal pressure P1 was reduced to atmospheric pressure.

[Second Variation of First Embodiment]

The first embodiment and the first variation have described structure examples where through hole 13 having a circular opening was provided. A second variation of the first embodiment will describe a structure where a through hole 13B having a substantially rectangular opening is provided.

Figure 7:
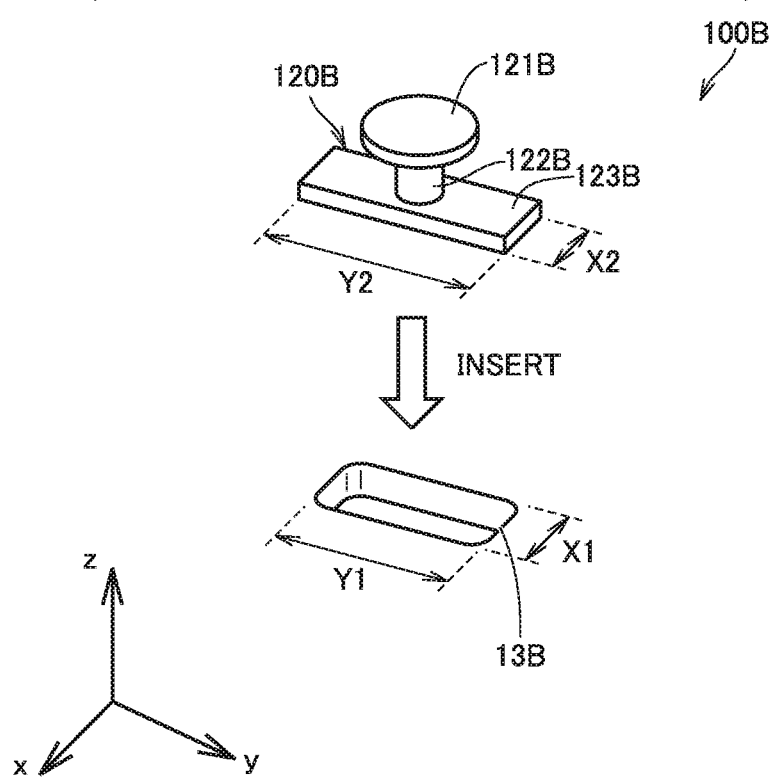
FIG. 7 is a perspective view showing a fixing member and a through hole in a second variation of the first embodiment.

FIG. 7 is a perspective view showing a fixing member 120B and through hole 13B in the second variation of the first embodiment. FIG. 8 is an enlarged perspective view showing in more detail the structure of a short-circuiting mechanism 100B in the second variation of the first embodiment.

Referring to FIGS. 7 and 8, a lid member 12B is provided with through hole 13B having a substantially rectangular opening. Through hole 13B has a long side length Y1 of 5.0 mm, for example, and a short side length X1 of 2.5 mm, for example. Through hole 13B has a depth of 1.0 mm, for example.

Inner flange portion 123B of fixing member 120B has the shape of a substantially rectangular parallelepiped, in conformity with the shape of through hole 13B. Inner flange portion 123B has a long side length Y2 of 6.0 mm, for example, which is longer than long side length Y1 of through hole 13B. Accordingly, when internal pressure P1 is increased with fixing member 120B being inserted into through hole 13B, inner flange portion 123B elastically deforms in its long side direction and exits through hole 13B, and has opposite end portions in the long side direction placed on the upper surface of lid member 12B after restoration.

On the other hand, inner flange portion 123B has a short side length X2 of 2.0 mm, for example, which is shorter than short side length X1 of through hole 13B. Although fixing member 120B is not provided with notches 124A such as those of fixing member 120A in the first variation (see FIG. 5), when fixing member 120B is inserted into through hole 13B, communication space S2 and housing space S1 are communicated with each other in a short side direction of inner flange portion 123B. Therefore, short-circuiting mechanism 100B is not provided with communication hole 130, similarly to short-circuiting mechanism 100A in the first variation. Inner flange portion 123B has a thickness of 0.60 mm, for example.

Since the structure of short-circuiting mechanism 100B is otherwise equivalent to the corresponding structure of short-circuiting mechanism 100 in the first embodiment (see FIG. 4), detailed description will not be repeated. In addition, since numerical values equivalent to those described in the first embodiment can be employed as the sizes of the respective components, detailed description will not be repeated.

In short-circuiting mechanism 100B, too, similarly to short-circuiting mechanism 100, even when explosion-proof valve 30 operates due to an increase in internal pressure P1, fixing member 120B is stretched taut between lid member 12B and reverse plate 110, causing the force of pressing reverse plate 110 against positive electrode short-circuit plate 150 and negative electrode short-circuit plate 160 to be applied from fixing member 120B to reverse plate 110. Thus, reverse plate 110 can retain the reversed shape. Accordingly, reverse plate 110 can be prevented from returning to the original shape, and the state where positive electrode short-circuit plate 150 and negative electrode short-circuit plate 160 are in contact with reverse plate 110 can be more reliably maintained. Thus, the short-circuited state between positive electrode terminal 50 and negative electrode terminal 60 can be more reliably maintained.

In the second variation of the first embodiment, too, verification tests similar to those in the first embodiment were performed. The results were that when internal pressure P1 reached 1.0 MPa, reverse plate 110 was normally reversed in all the secondary batteries. An average value of internal pressures P1 upon reversal of reverse plates 110 was 0.71 MPa, which was higher than the values in the first embodiment and its first variation. It was also confirmed that the short-circuited state between positive electrode terminal 50 and negative electrode terminal 60 was normally maintained even when internal pressure P1 was reduced to atmospheric pressure.

Second Embodiment

Although the first embodiment as well as the first and second variations have described structure examples where inner flange portions 123, 123A and 123B are provided, the inner flange portion is not a required component. A second embodiment will describe a structure where the inner flange portion is not provided.

FIG. 9 is a schematic diagram for illustrating the structure of a short-circuiting mechanism 200 included in a secondary battery according to the second embodiment. FIG. 10 is an enlarged perspective view showing in more detail the structure of short-circuiting mechanism 200.

Referring to FIGS. 9 and 10, short-circuiting mechanism 200 is different from short-circuiting mechanism 100 in the first embodiment (see FIG. 3 or 4) in that it includes a fixing member 220 instead of fixing member 120, and that a through hole 23 is formed instead of through hole 13 in a lid member 22.

Through hole 23 has a shape extending in a straight line from a circular opening. That is, through hole 23 does not have such a tapered shape as that of through hole 13 in the first embodiment (see FIG. 4). Through hole 23 has a diameter of 1.2 mm, for example.

Fixing member 220 includes, as its components, an outer flange portion 221 and a shaft portion 222, but does not include an inner flange portion. Fixing member 220 is formed using an elastically deformable material such as rubber, similarly to fixing member 120. Shaft portion 222 has a solid cylindrical shape with one end joined to reverse plate 110. Shaft portion 222 has a diameter of 1.2 mm, for example, which is almost equal to that of through hole 23.

When short-circuiting mechanism 200 is seen in plan view in the vertical direction, the center of shaft portion 222 is shifted (off-centered) from the center of through hole 23 at the upper surface of lid member 22. The magnitude of this shift (distance between the two centers) is 0.3 mm, for example. Shaft portion 222 has a diameter almost equal to that of through hole 23. In this manner, in the second embodiment, shaft portion 222 that has not elastically deformed is provided to make contact with, in other words, to interfere with, the upper surface of lid member 22. Therefore, shaft portion 222 is inserted into through hole 13 in an elastically bent state. Although FIGS. 9 and 10 show solid shaft portion 222, shaft portion 222 may have a hollow shape.

Since the structure of the secondary battery according to the second embodiment is otherwise equivalent to the corresponding structure of secondary battery 1 according to the first embodiment, detailed description will not be repeated. In addition, since numerical values equivalent to those described in the first embodiment can be employed as the sizes of the respective components, detailed description will not be repeated.

When reverse plate 110 is reversed and fixing member 220 is pulled upward and exits through hole 13 due to an increase in internal pressure P1, shaft portion 222 is restored from the elastically deformed state. Consequently, the other end of shaft portion 222 (end opposite to the one end joined to reverse plate 110) is placed on the upper surface of lid member 22. Accordingly, fixing member 220 is fixed in communication space S2 between reverse plate 110 and lid member 22, while being stretched taut in the vertical direction to support reverse plate 110.

As described above, according to the second embodiment, fixing member 220 is inserted into through hole 23 in a bent state. Fixing member 220 exits through hole due to an increase in internal pressure P1, and is restored from the bent state, to be fixed between reverse plate 110 and lid member 22. Then, fixing member 220 is stretched taut in the vertical direction, causing the force of pressing reverse plate 110 against positive electrode short-circuit plate 150 and negative electrode short-circuit plate 160 to be applied from fixing member 220 to reverse plate 110. Accordingly, even when internal pressures P1 and P2 are reduced after the reversal of reverse plate 110, reverse plate 110 can retain the reversed shape. Thus, positive electrode short-circuit plate 150 and negative electrode short-circuit plate 160 can be brought into conduction through reverse plate 110, and the short-circuited state between positive electrode terminal 50 and negative electrode terminal 60 can be more reliably maintained.

In short-circuiting mechanism 200, too, the length of shaft portion 222 is preferably equal to or greater than the longer one of the distance between positive electrode short-circuit plate 150 and lid member 22, and the distance between negative electrode short-circuit plate 160 and lid member 22.

In the second embodiment, too, verification tests similar to those in the first embodiment were performed. The results were that when internal pressure P1 reached 1.0 MPa, reverse plate 110 was normally reversed in all the secondary batteries. An average value of internal pressures P1 upon reversal of reverse plates 110 was 0.68 MPa. It was also confirmed that the short-circuited state between positive electrode terminal 50 and negative electrode terminal 60 was normally maintained even when internal pressure P1 was reduced to atmospheric pressure.

[Variation of Second Embodiment]

Although the second embodiment has described a structure where shaft portion 222 is inserted into through hole 23 in a bent state, a variation of the second embodiment will describe a structure where a shaft portion 222A is inserted into through hole 13B in a radially compressed state.

Figure 11:
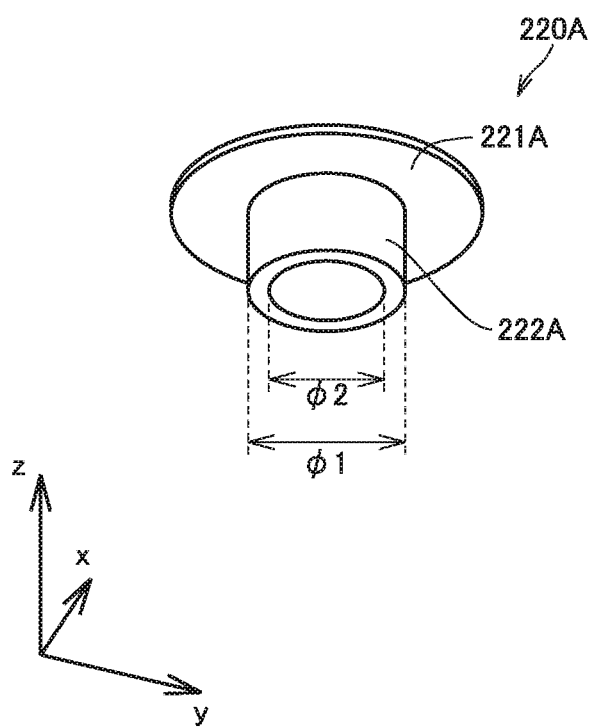
FIG. 11 is a perspective view showing an exemplary fixing member in a variation of the second embodiment.
Figure 12:
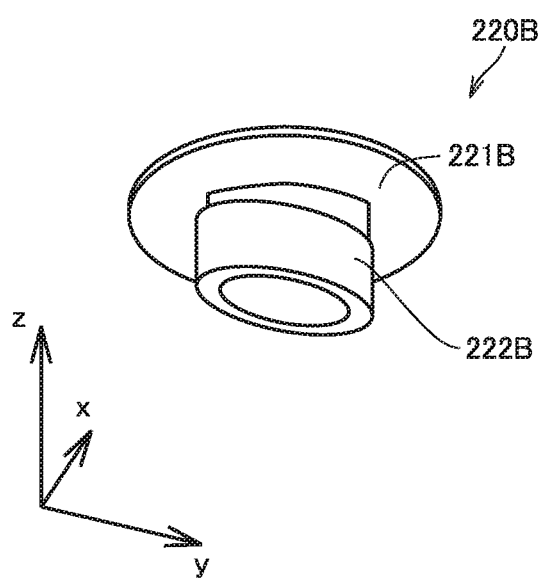
FIG. 12 is a perspective view showing another exemplary fixing member in a variation of the second embodiment.

FIG. 11 is a perspective view showing an exemplary fixing member 220A in a variation of the second embodiment. FIG. 12 is a perspective view showing another exemplary fixing member 220B in a variation of the second embodiment.

As shown in FIG. 11, shaft portion 222A of fixing member 220A has a hollow cylindrical shape (annular ring shape). Shaft portion 222A has an outer diameter $\phi 1$ of 4.0 mm, for example, and an inner diameter $\phi 2$ of 3.0 mm, for example. As has been described in the second variation of the first embodiment, short side length X1 of through hole 13B is 2.5 mm, which is shorter than outer diameter $\phi 1$ of shaft portion 222A. Accordingly, shaft portion 222A is provided to make contact with, and interfere with, lid member 12B.

As shown in FIG. 12, shaft portion 222B of fixing member 220B may be formed to have a cross section inclined in the vertical direction. Communication space S2 and housing space S1 can thereby be communicated with each other more reliably when fixing member 220B is fixed in communication space S2.

Since the structure of the secondary battery according to the variation of the second embodiment is otherwise equivalent to the corresponding structure of secondary battery 1 according to the first embodiment, detailed description will not be repeated. In addition, since numerical values equivalent to those described in the first embodiment can be employed as the sizes of the respective components, detailed description will not be repeated.

FIG. 13 is an enlarged perspective view showing in detail the structure of a short-circuiting mechanism 200A in the variation of the second embodiment. In the normal state, shaft portion 222A is inserted into through hole 13B while being elastically compressed in a radial direction of shaft portion 222A (a short side direction of through hole 13B or an x direction) so that the outer diameter of shaft portion 222A is equal to short side length X2 of through hole 13B.

When reverse plate 110 is reversed and fixing member 220A is pulled upward and exits through hole 13B due to an increase in internal pressure P1, shaft portion 222B is restored from the compressed state. Shaft portion 222B is thereby placed on the upper surface of lid member 12B without falling into through hole 13B again. Thus, fixing member 220B is fixed in communication space S2, while being stretched taut in the vertical direction to retain reverse plate 110 in the reversed state.

As described above, in short-circuiting mechanism 200A, too, even when explosion-proof valve 30 operates to reduce internal pressures P1 and P2 due to an increase in internal pressure P1, fixing member 220A (or 220B) is stretched taut between lid member 12B and reverse plate 110, causing the force of pressing reverse plate 110 against positive electrode short-circuit plate 150 and negative electrode short-circuit plate 160 to be applied from fixing member 120 to reverse plate 110. Reverse plate 110 can thereby retain the reversed shape. Accordingly, reverse plate 110 can be prevented from returning to the original shape, and the state where positive electrode short-circuit plate 150 and negative electrode short-circuit plate 160 are in contact with reverse plate 110 can be more reliably maintained. Thus, the short-circuited state between positive electrode terminal 50 and negative electrode terminal 60 can be more reliably maintained.

In the variation of the second embodiment, too, verification tests similar to those in the first embodiment were performed. The results were that when internal pressure P1 reached 1.0 MPa, reverse plate 110 was normally reversed in all the secondary batteries. An average value of internal pressures P1 upon reversal of reverse plates 110 was 0.67 MPa. It was also confirmed that the short-circuited state between positive electrode terminal 50 and negative electrode terminal 60 was normally maintained even when internal pressure P1 was reduced to atmospheric pressure.

Although the first and second embodiments have described examples where the secondary battery is a lithium-ion secondary battery, the secondary battery may be another secondary battery (for example, a nickel-metal hydride battery). Although the case of the secondary battery has been described as having a prismatic shape by way of example, the shape of the case is not particularly limited, and may be a cylindrical shape, for example. In addition, although the short-circuiting mechanism has been described as being formed in the lid member by way of example, the short-circuiting mechanism may be formed in another portion (for example, a side surface) of the case.

Third Embodiment

Although the first and second embodiments have described structures where positive electrode short-circuit plate 150 and negative electrode short-circuit plate 160 are short-circuited through reverse plate 110 by way of example, the structure may be such that positive electrode terminal 50 and negative electrode terminal 60 are short-circuited through the reverse plate and the case.

Figure 14:
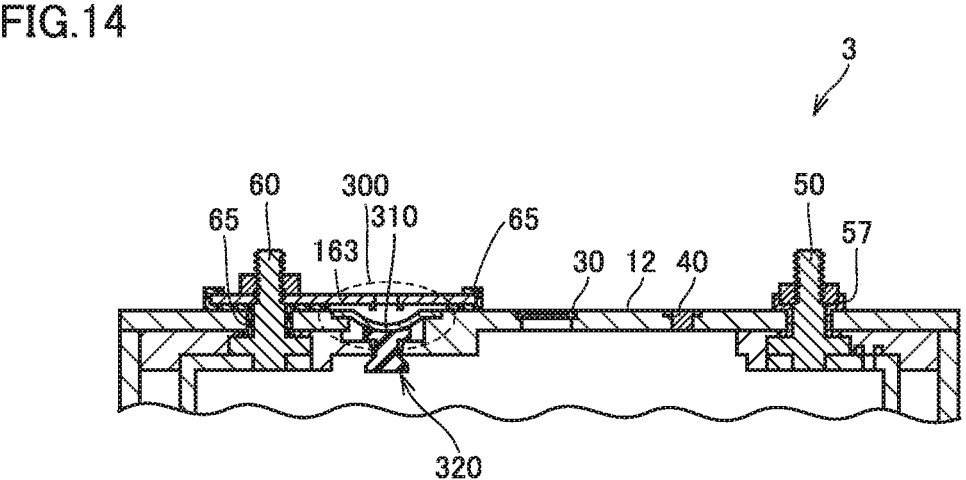
FIG. 14 is a sectional view of a secondary battery according to a third embodiment.

FIG. 14 is a sectional view of a secondary battery 3 according to a third embodiment. Since the structure of a short-circuiting mechanism 300 provided in secondary battery 3 is basically equivalent to the structure of short-circuiting mechanism 100 in the first embodiment (see FIG. 1), detailed description will not be repeated.

As shown in FIG. 14, negative electrode terminal 60 is electrically connected to a connection plate (short-circuit portion) 163, but is insulated from lid member 12 by insulator 65. On the other hand, positive electrode terminal 50 is electrically connected to lid member 12 by a connection member 57.

When a reverse plate 310 is reversed (not shown) with an increase in internal pressure P1 in housing space S1, reverse plate 310 and connection plate 163 make contact with each other. Positive electrode terminal 50 and negative electrode terminal 60 are thereby short-circuited (electrically connected) through connection plate 163, reverse plate 310 and lid member 12. In so doing, a fixing member 320 is fixed between reverse plate 310 and lid member 12 (communication space S2), to thereby support reverse plate 310 after the reversal. Although short-circuiting mechanism 300 is provided on the negative electrode side in the example of FIG. 14, short-circuiting mechanism 300 may be provided on the positive electrode side.

Fourth Embodiment

Figure 15:
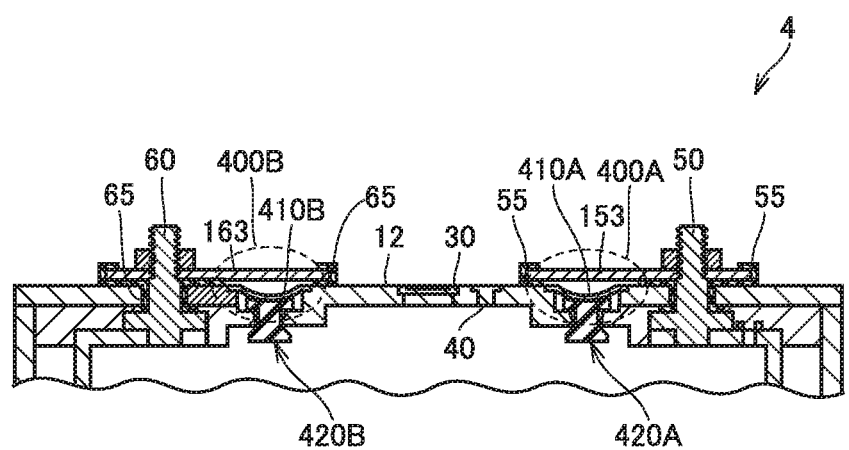
FIG. 15 is a sectional view of a secondary battery according to a fourth embodiment.

FIG. 15 is a sectional view of a secondary battery 4 according to a fourth embodiment. A shown in FIG. 15, secondary battery 4 may have a structure including two short-circuiting mechanisms 400A and 400B. Since the structure of each of short-circuiting mechanisms 400A and 400B is basically equivalent to the structure of short-circuiting mechanism 100 in the first embodiment (see FIG. 1), detailed description will not be repeated.

Positive electrode terminal 50 is electrically connected to a connection plate 153, but is insulated from lid member 12 by insulator 55. Similarly, negative electrode terminal 60 is electrically connected to connection plate 163, but is insulated from lid member 12 by insulator 65.

According to the structure shown in FIG. 15, both reverse plates 410A and 410B are reversed (not shown) with an increase in internal pressure P1. The reversal of reverse plate 410A causes reverse plate 410A to make contact with connection plate 153. Positive electrode terminal 50 and lid member 12 are thereby electrically connected through reverse plate 410A and connection plate 153. Similarly, the reversal of reverse plate 410B causes reverse plate 410B to make contact with connection plate 163. Negative electrode terminal 60 and lid member 12 are thereby electrically connected through reverse plate 410B and connection plate 163. As a result, positive electrode terminal 50 and negative electrode terminal 60 are short-circuited (electrically connected) through connection plate 153, lid member 12 and connection plate 163.

In so doing, a fixing member 420A is fixed between reverse plate 410A and lid member 12 (communication space S2), to thereby support reverse plate 410A after the reversal. Similarly, a fixing member 420B is fixed between reverse plate 410B and lid member 12 (communication space S2), to thereby support reverse plate 410B after the reversal.

[Variation of First to Fourth Embodiments]

The first to fourth embodiments have described structures where the reverse plate provided directly above the through hole covers the through hole by way of example. However, the reverse plate may be provided at a position different from the position directly above the through hole, so long as the space above the through hole is sealed by the reverse plate. In addition, of the outer flange portion, the shaft portion and the inner flange portion which are the components of the fixing member, the outer flange portion is not a required component.

Figure 16:
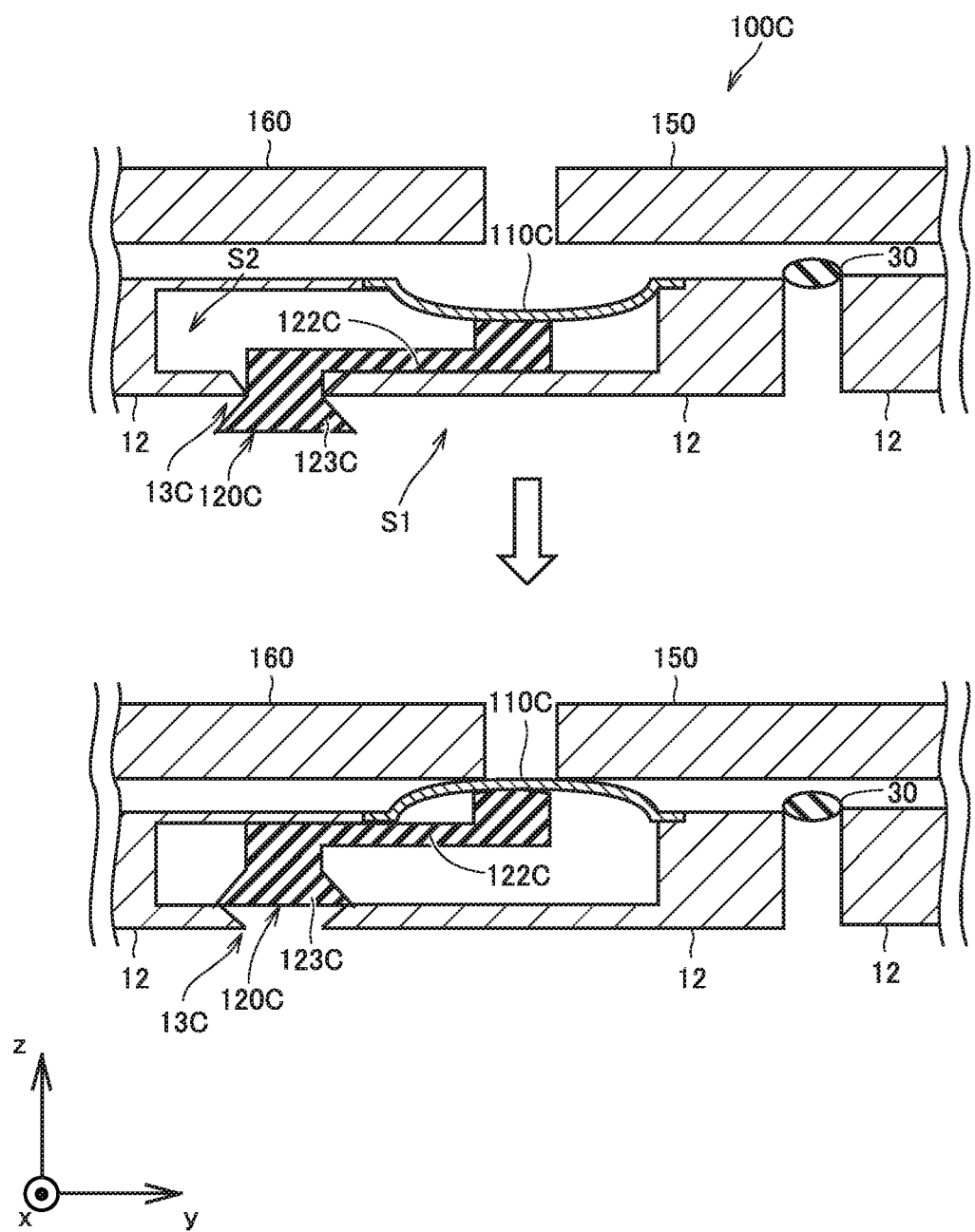
FIG. 16 is an enlarged sectional view schematically showing the structure of a short-circuiting mechanism in a variation of the first to fourth embodiments.

FIG. 16 is an enlarged sectional view schematically showing the structure of a short-circuiting mechanism 100C in a variation of the first to fourth embodiments. As shown in FIG. 16, a reverse plate 110C is provided at a position different from the position of a through hole 13C in the vertical direction. A fixing member 120C includes a shaft portion 122C and an inner flange portion 123C, but does not include an outer flange portion. Inner flange portion 123C is located below the lower surface of lid member 12, that is, in housing space S1, in the normal state (before an increase in internal pressure P1; see the upper figure). Shaft portion 122C is coupled to the lower surface of reverse plate 110, and extends between reverse plate 110 and inner flange portion 123C in a direction along the surface of lid member 12.

In such a structure, too, when reverse plate 110C is reversed with an increase in internal pressure P1, positive electrode short-circuit plate 150 and negative electrode short-circuit plate 160 are short-circuited through reverse plate 110C (see the lower figure). In so doing, fixing member 120C elastically deforms from the state where it is inserted into through hole 13C, exits through hole 13C and is fixed between reverse plate 110C and lid member 12 (communication space S2), thereby supporting reverse plate 110 after the reversal.

The first to fourth embodiments and the respective variations discussed above have described examples where the fixing member is entirely formed of an elastically deformable material. However, in order not to obstruct and inhibit the passing of the fixing member through the through hole, the fixing member may only partly be formed of an elastically deformable material, and the remaining part may be a rigid body formed of an elastically undeformable material. In other words, the fixing member may be formed to include an elastically deformable material.

Although the embodiments of the present disclosure have been described, it should be understood that the embodiments disclosed herein are illustrative and non-restrictive in every respect. The scope of the present disclosure is defined by the terms of the claims, and is intended to include any modifications within the scope and meaning equivalent to the terms of the claims.

What is claimed is:

1. A secondary battery comprising:
    a battery element including a first electrode and a second electrode;
    a case formed with a through hole and having a housing space that houses the battery element;
    a first electrode terminal provided in the case and electrically connected to the first electrode;
    a second electrode terminal provided in the case and electrically connected to the second electrode;
    a reverse plate formed of a conductive material and provided in the case; and
    a fixing member formed to include an elastically deformable material, and coupled to the reverse plate while being inserted into the through hole,
    a communication space being formed between the case and the reverse plate, the communication space being communicated with the housing space through the through hole,
    an increase in internal pressure in the housing space also causing an increase in internal pressure in the communication space,
    wherein, the reverse plate is in a first position before the internal pressure is increased, and the reverse plate does not contact the first electrode terminal and the second electrode terminal,
    wherein, the reverse plate is in a second position when the internal pressure is increased, and the reverse plate is deformed so that the reverse plate contacts the first electrode terminal and the second electrode terminal, thereby electrically connecting the first electrode terminal and the second electrode terminal,
    wherein, the fixing member elastically deforms and exits the through hole with the increase in the internal pressure in the housing space, so as to be fixed in the communication space, and
    the reverse plate in the deformed state is supported by the fixing member fixed in the communication space.

2. The secondary battery according to claim 1, further comprising a short-circuit portion electrically connected to one of the first electrode terminal and the second electrode terminal, wherein
    the case includes
        a case body formed with an opening, and
        a lid member that closes the opening and forms the communication space between the reverse plate and the lid member,
    the short-circuit portion is provided opposite to the case body with the lid member interposed therebetween, and spaced from the lid member,
    the reverse plate deforms from the lid member side toward the short-circuit portion in response to the increased internal pressure in the housing space, to thereby make contact with the short-circuit portion, and
    in a direction from the lid member toward the short-circuit portion, a length of the fixing member before the increase in the internal pressure in the housing space is equal to or greater than a distance between the lid member and the short-circuit portion.

3. The secondary battery according to claim 1, wherein the case includes a case body and a lid that closes the case body, wherein the through hole is formed in the lid, and the lid further includes a communication hole in the lid that is separate from the through hole.

4. The secondary battery according to claim 1, wherein the fixing member includes a projection projecting toward an outer circumference with respect to the through hole when the through hole is seen in plan view, and the projection is disposed in the housing space before the increase in the internal pressure in the housing space.

5. The secondary battery according to claim 1, wherein the fixing member includes a solid cylindrical shaft portion with one end coupled to the reverse plate, and when the internal pressure in the housing space is increased, the shaft portion exits the through hole and is restored from a state where it is bent and inserted into the through hole, and is fixed in the communication space.

6. The secondary battery according to claim 1, wherein the fixing member includes a hollow cylindrical shaft portion with one end coupled to the reverse plate, and when the internal pressure in the housing space is increased, the shaft portion exits the through hole and is restored from a state where it is radially compressed and inserted into the through hole, and is fixed in the communication space.

7. The secondary battery according to claim 1, wherein the fixing member is partially located inside the case, and below a lower surface of the lid member, when the reverse plate is in the first position.

\* \* \* \* \*